United States Patent [19]

Gilbert

[11] Patent Number: 4,878,241

[45] Date of Patent: Oct. 31, 1989

[54] AUDIO FREQUENCY INTERFACE FOR DIFFERENTIAL RELAYS

[75] Inventor: Everett A. Gilbert, Montrose, Colo.

[73] Assignee: Da-Tel Research Company, Incorporated, Montrose, Colo.

[21] Appl. No.: 252,582

[22] Filed: Oct. 3, 1988

[51] Int. Cl.$^4$ .......................................... H04M 11/00
[52] U.S. Cl. ...................................... 379/106; 379/102; 379/97; 340/658; 324/83 A; 324/86; 324/107
[58] Field of Search ................ 379/106, 107, 109, 102, 379/103, 90, 97; 324/66, 83 R, 83 A, 86, 107, 108; 340/658

[56] References Cited

U.S. PATENT DOCUMENTS

| | | | |
|---|---|---|---|
| 4,626,622 | 12/1986 | Bouvrette | 379/106 X |
| 4,718,079 | 1/1988 | Rubito | 379/106 X |
| 4,724,435 | 2/1988 | Moses et al. | 379/106 X |

Primary Examiner—James L. Dwyer

[57] ABSTRACT

The invention interfaces a two-wire 60 Hz circuit to two circuits, each unidirectional, sending and receiving, and carrying frequency modulated audio tones containing the amplitude and phase of the 60 Hz voltage impressed on the 60 Hz circuit. The invention is used to interface differential relays used by electric utilities to detect power transmission line faults to a four-wire voice band communication line.

3 Claims, 2 Drawing Sheets

AUDIO FREQUENCY INTERFACE FOR DIFFERENTIAL RELAYS

This invention relates to the difficulty in transmitting 60 Hz voltages with correct phase and amplitude through the modern telephone system. Electric power utilities use a phase sensitive differential relay to detect faults on power transmission lines. A differential relay is required at each end of the transmission line being protected. It is necessary to compare the phase and amplitude of the 60 Hz voltage outputs of these relays. This has been done in the past by the telephone companies in providing a two-wire line between stations consisting of two copper conductors insulated for 600 volts. The telephone companies now find this to be impractical and not compatible to the modern networks that use audio transformers, fiber optic lines, microwave and carrier links with no provision for carrying 60 Hz currents end-to-end through the system. Telephone companies many times refuse to provide the two-wire low resistance copper telephone line needed.

My invention permits electric power utilities to lease modern four-wire telephone lines to connect their differential relays at reasonable rates.

The basic object of my invention is to convert two-wire, bi-directional low frequency voltage signals to four-wire higher frequency FM modulated send and receive signals that can be transmitted long distances through modern communication links.

An object of my invention is to minimize the effect of the variation of signal levels in the telephone network upon the operation of differential relays.

An object of this invention is to prevent the act of breaking or shorting telephone lines from tripping the differential relays.

An object of this invention is to prevent noise in the telephone networks from tripping the differential relays.

These and other objects and advantages will become apparent from the following description when taken with the accompanying drawings which illustrate one embodiment of the invention, it being understood that the description is not to be construed as restricting the scope of the invention beyond the terms of the claims appended hereto. The drawings show the embodiment of the invention as used with a Westinghouse HCB Differential Relay. The phase sensitive relay of other manufacturers could be used equally as well to describe may invention.

In the drawings wherein like reference charactors identify like parts in the views.

Figure 1:
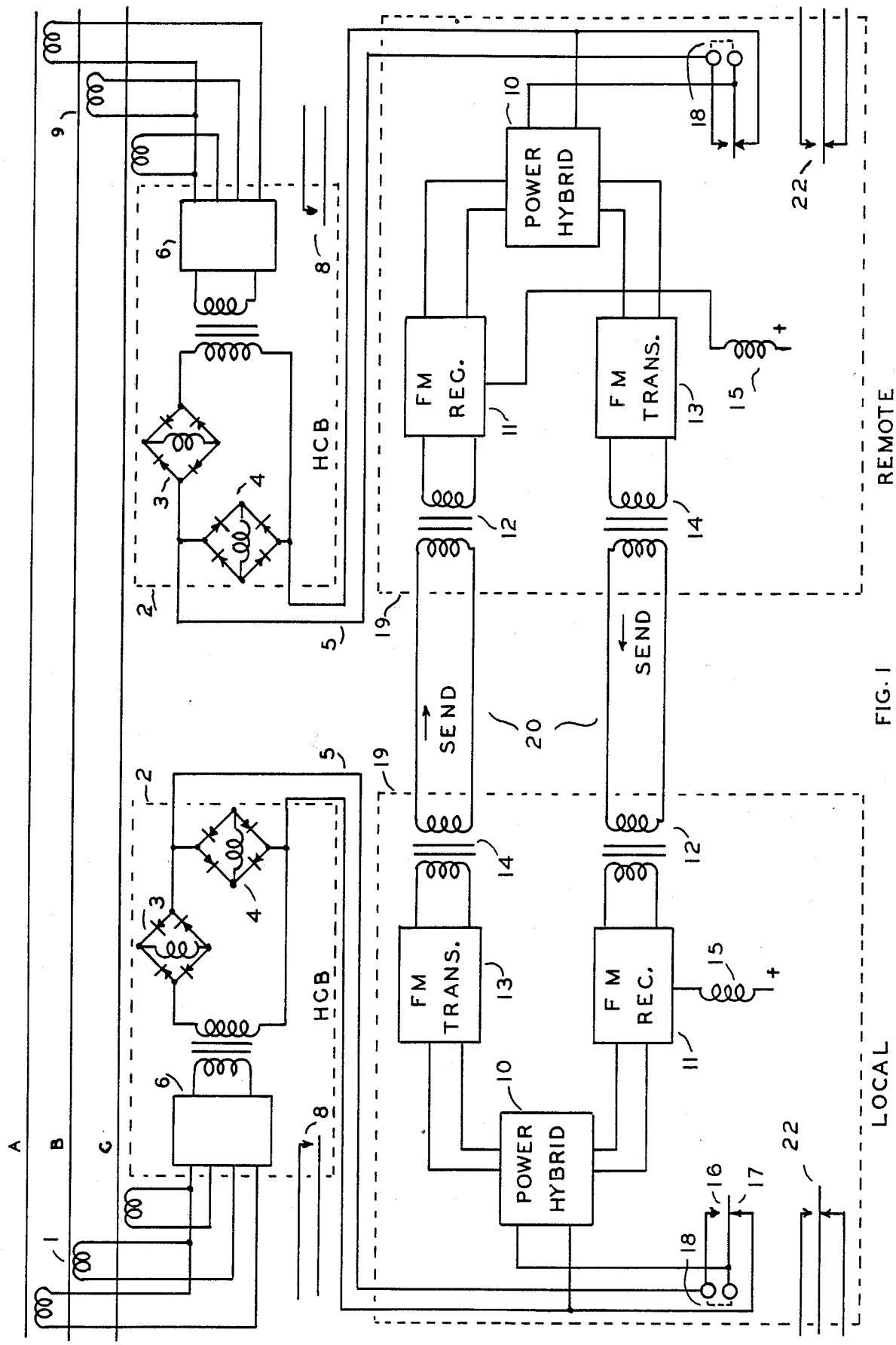
FIG. 1 is a simplified diagram showing two differential relays protecting a section of a three-phase power transmission line. The special copper, low resistance, two conductor telephone line that normally connects the two relays has been replaced with two of my interface inventions and a standard voice fourwire telephone line.

Referring now to FIG. 1, for years electric power companies have used the simple differential relays to protect their electric power transmission lines from faults. The three lines marked, Phase A, B, C, represent the three phase power line. Three current transformers 1 are mounted at one station, and three identical transformers 9 are mounted at the remote station. The current transformer outputs are applied to differential relays 2 at both ends. To show a commercial application of my invention, I have drawn all my figures showing the use of my interface between HCB/HCB-1 Differential Relays as manufactured by Westinghouse Electric Company. My invention can be adapted by those skilled in the art to differential relays made by other manufacturers, as they all operate on the same principle. The use of the HCB relay in may description is not to be construed as restricting the scope of the invention beyond the terms of the claims appended hereto.

The three phase inputs to the HCB relay 2 are converted to a single phase output by filter 6. As the relays are identical, a single phase output also appears at the filter output of the remote station. At this remote station, the winding of the three current transformers 9 are reversed in phase making the filter output at the remote station additive to the output of filter 6 at the local station for normal line currents and fault currents due to transmission line failure at points outside the current transformers. When my invention is not inserted in the system, a relatively large 60 Hz current normally flows around the loop consisting of restraining coils 3, telephone line 5 and the similar restraining coil in relay 7. When the telephone line 5 is relatively short, a small voltage occurs across the operate coil 4 and the similar operate coil in relay 7. This small voltage does not operate the relay due to the large current through the restraining coils 3. As the telephone line lengthens and its resistance increases, the voltage across the operate coils increase and the restraining current decreases, making the present systems unreliable for long telephone lines. The insertion of my invention as shown eliminates this restriction as the relays always perform in it as if connected back-to-back. When a fault occurs between the current transformers 1 and 9, the voltage output of the remote filter reverses 180 degrees in phase with respect to the local filter output. This reduces the circulating restraining current to near zero and, with bucking voltages, places maximum voltage across the operating coil 4 and closes the contacts 8 of the relay and likewise the output contacts of the remote relay. These contact closures trip out the power line breakers at both stations and protects the power system from overload.

I have replaced the usual telephone line 5 of FIG. 1 with my invention, one unit at each station with a four-wire telephone line 20 connecting the stations. Arrows show the second and receive directions of this four-wire telephone line. As the information flows in a unidirectional manner in these wires, amplifiers can be used in them to correct signal levels for attenuation and they can interface directly to microwave links and fiber optic communication circuits.

My invention consists of connecting an FM transmitter 13, an FM receiver 11, a power hybrid 10 and control relay 15 with contacts 16, 17 and 22, operated by changes in the RECEIVE FM signal level, as shown. In the version that I have selected to describe, the FM transmitter 13 is a linear converter of voltage-to-frequency with a zero voltage input represented by 1800 Hz output and +6 volts at the input represented by 2800 Hz at the output and −6 volts at the input represented by 800 Hz. The FM receiver 11 is a linear converter of frequency to voltage with 2800 Hz input corresponding to +2.5 Vdc output and 800 Hz input corresponding to −2.5 Vdc output. The power hybrid 10 is unique in that it has the ability to output 2 watts at 60 Hz. Hybrids used in similar communication circuits output 10 to 20 millivolts over frequency ranges of 300 to 3000 Hz. The hybrid is characterized by the FM receiver output being transmitted to the differential relay 2 but not to the FM transmitter 13 input.

The relay 15 is operated by a carrier detector circuit that is sensitive to the FM signal level impressed on the FM receiver 11. When the signal level is proper, the normally open contact 16 is closed, and the differential relay 2 is connected to power hybrid 10. Also the normally open alarm contacts 22 are closed. My invention, then, operates to replace a low resistance telephone line. If the power supply fails or the four-wire telephone is broken, relay 15 becomes unenergized, and contact 16 opens and disconnects the power hybrid 10 from the differential relay 2. This allows the differential relay to operate as an over-current relay in case a fault occurs on the power line. Contact 17 closed and shorts the output of the power hybrid 10 sending a zero voltage signal to the remote hybrid 10, so permitting remote relay 2 to operate as an over-current relay. Also, power failure and loss of telephone line opens alarm contact 22 causing the station alarm bells to ring, calling attention to the failure. If links 18 at the local and remote station are installed, failure of power supplies or telephone line causes the output contacts of differential relay in the station of failure to be blocked.

Figure 2:
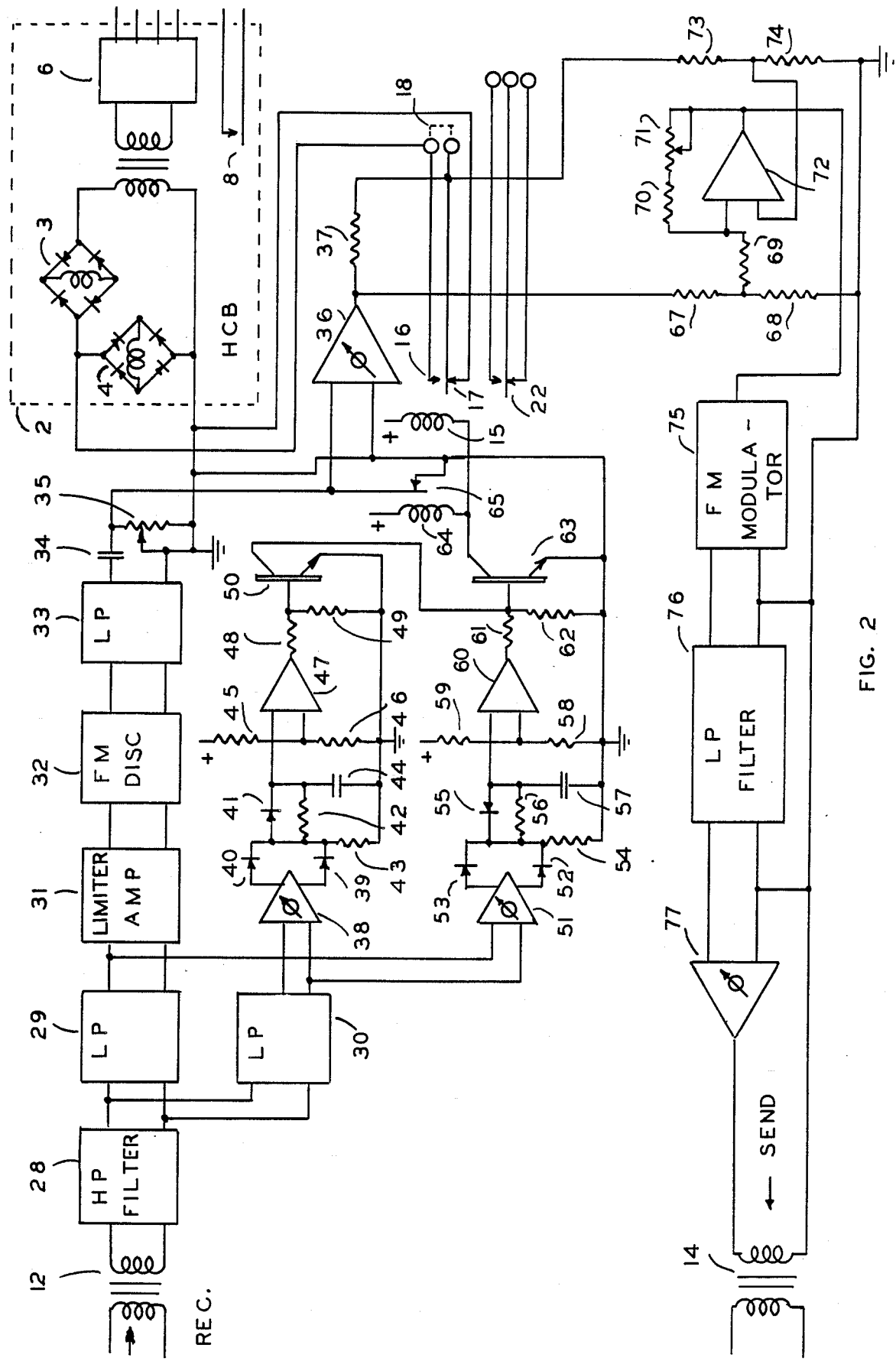
FIG. 2 is a diagram showing the component parts of the Audio Frequency Interface for Differential Relays and the details of a practical embodiment of my invention.

Refer now to FIG. 2 for a detailed description of an embodiment of my invention that encompasses filters and noise detection circuits for use on poor communication links and a receive low pass filter that permits the frequency multiplexing of my invention with other tones higher in frequency than the 800 to 2800 Hz FM tone signals used by the interface. Frequency assignments given are not intended to limit the scope of the claims.

Transformer 12 isolates the usual balanced receive line from the unbalanced filter and circuitry in my interface. The high pass filter 28 attenuates 60 Hz noise voltages that may be present on telephone lines installed near 60 Hz power lines. The low pass filter 29 attenuates frequencies above 4000 Hz so that tones or noise on the line above this do not affect the performance of the interface. The low pass filter 30 with high pass filter 28 make up a noise filter that passes frequencies in the range of 150 to 400 Hz. In this embodiment the 800 to 2800 Hz receive signal has been linearly frequency modulated at the transmitter with the 60 Hz voltage output from the differential relays. The 2800 Hz corresponds to the positive peak of the 60 Hz sine wave and 800 Hz corresponding to the negative peak of the 60 Hz wave. This FM signal is applied to the limiting amplifier 31 and converted to a square wave. The output square wave is unaffected by amplitude for signal levels of 0.01 to 1.0 volts. The FM discriminator 32 converts each transition of the square wave to a positive going pulse of constant height and width. The pulse frequency at the output of the discriminator is 1600 to 5600 Hz per second. Low pass filter 33 removes the fundamental and harmonics frequencies above 1600 Hz leaving the dc or 60 Hz component at the output of filter 33.

Capacitor 34 and adjustable resistor 35 form a leading phase network for the 60 Hz voltage output of the filter 33. The envelope (group) delay in the FM transmitter and FM receiver is 0.8 milliseconds or 17 degrees in phase of the 60 Hz voltage. With an allowance of 2.0 ms of envelope delay in the communication networks, the total delay could be 2.8 ms or a phase shift of 61 degrees at 60 Hz. The values of capacitor 34 and resistor 35 are selected to vary the leading phase of the 60 Hz voltage from 17 to 61 degrees and permit the adjustment of the steady state phase at the output of variable gain power amplifier 36 to be the same as if the differential relays were connected back-to-back with no distance between them.

The power amplifier 36 in this embodiment is designed to output 2.0 watts into 200 ohms and has a very low internal impedance. Resistor 37 is selected to be approximately equal to the internal impedance of the differential relay. A 100 ohm wire wound power resistor is used for HCB relays. The voltage present at both ends of resistor 37 is attenuated by the same fractional amount with attenuator resistor 67 and 68 at one end and 73 and 74 at the other to bring the 60 Hz voltages within the operating range of integrated op-amp 72. Resistor 70 and 71 set the gain of op-amp 72 to approximately 2, so completing the hybrid network. This circuit, without attenuation 67, 68 and 73, 74 and designed for a few milliwatts output has been published and is well known. To understand the hybrid operation, not that when the output voltage of the power amplifier is zero and contact 16 closed, a voltage generated in the differential relay is outputed to the FM modulator 75 by op-amp 72. When there is no voltage generated in the differential relay and a 60 Hz receive voltage is present at the output of power op-amp 36, the voltage at the junction of resistor 73 and 74 is one half the voltage at the junction of 67 and 68. With a gain of 2 in opamp 72 and a phase inversion, no voltage is present at the output of op-amp 72. The variable resistor 71 allows the hybrid to be balanced for no output to the FM modulator 75 for a standard operating level at the output of the power op-amp 36 and no output from the HCB relay.

The FM modulator 75 is a linear voltage to frequency converter with bias controls to set the positive peak of the 60 Hz sine wave input to output a 2800 Hz sine wave and the negative peak at an 800 Hz sine wave. The low pass filter 76 removes all harmonics and modulation products above 4000 Hz. Amplifier 77 adjusts the signal level applied to the send communication line. Transformer 14 isolates the unbalanced circuits of the interface from the balanced send line.

The circuits as described above functionally replace the low resistance copper two wire line traditionally used to connect up differential relays with a four-wire modern communication circuit. The following control circuits are essential to make a practical system that can safely operate the relays in the real world of shorted and disconnected lines and high noise levels on telephone lines particularly during power line faults.

Amplifier 51 monitors the received FM tone level. Diodes 52 and 53 rectify the amplifier 51 output to obtain a dc voltage across resistor 54. Resistor 56 and capacitor 57 provide a time delay on first appearance of the tone. Rectifier 55 discharges capacitor 57 quickly on loss of tone. Resistors 58 and 59 provide a reference voltage. When this reference voltage is exceeded by the voltage on capacitor 57, the output of op-amp 60 goes high and turns on transistor 63 through base resistors 61 and 62. Relay coil 64 is then energized and the normally closed contacts 65 open, releasing the short across resistor 35 and permitting amplifier 36 to function. Relay coil 15 is also energized closing normally open contact 16 and opening contact 17 to release the short across the interface output. The interface is now in operation. If the received tone level falls below the set level, the lead to the HCB relay is quickly opened up and the interface output shorted, sending a zero voltage 60 Hz signal to the remote relay. Both the remote relay and the local relay then operate as over-current relays for the loss of signal in one pair of the fourwire line. When link 18 is installed, the loss of received signal shorts the local relay down and prevents any operation of it. The gain of amplifier 51 is set so the circuit changes state for a received FM signal level −6 dB to −10 dB below the normal operating signal levels.

Amplifier 38 monitors the noise voltages on the telephone in the 150 to 400 Hz band. Diodes 39 and 40 rectify the output of amplifier 38 and create a dc voltage across resistor 43 proportional to the average noise voltage. Resistor 42 and capacitor 44 filter the dc voltage across resistor 43. When the noise increases, diode 41 quickly charges capacitor 44. When the noise decreases, capacitor 44 slowly discharges through resistor 42. Resistors 45 and 46 provide a reference voltage. When the voltage across capacitor 44 exceeds this reference voltage, the output of op-amp 47 goes high and causes transistor 50 through base resistors 48 and 49 to clamp down the base of transistor 63 and set this circuit into the loss of FM signal condition with the results as described for this.

Alarm contacts 22 are provided on relay 15 to signal to operators that the interface is out of operation due to loss of communications or a high noise level.

Having now described my invention in detail, various changes in the individual components and in the arrangement of the parts will become apparent to those skilled in the art. Changes of this character, which fall within the scope and spirit of the invention, are intended to be covered by the following claims.

I claim:

1. A differential relaying system in an electric power network, each end comprising:

a differential relay with current transformers that detects a fault on a three phase 60 Hz power line, converts the fault currents to a single phase 60 Hz voltage output, compares the phase of this voltage to the voltage received from a similar remote relay and closes a contact for the power line phase of a fault between relays;

a power hybrid that converts the single phase output of the differential relay to a sending and a receiving port, the voltage output of the sending port being proportional to the single phase voltage output of the differential relay and the power input to the receiving port being the same as though two differential relays were connected back-to-back;

a linear FM receiver with its output connected to the above receiving port and a linear FM transmitter with its input connected to the hybrids sending port to form separate sending and receiving communication channels;

means to open the connection to the differential relay and short down the output of the hybrid for low levels of FM signal input to the FM receiver;

means to short down the voltage output of the FM receiver when the FM input signal to the receiver is not present or at a lower than desired level;

means to short down the voltage output of the FM receiver when noise appears in the received FM signal.

2. The invention as recited in claim 1 with means to short the operate coil of the differential relay and block its operation on loss of communication line or high noise on the line.

3. A differential relaying system in an electric power network with remote and local ends each end comprising;

a differential relay with current transformers that detects faults on a three phase 60 Hz power line, converts the fault currents to a single phase 60 Hz voltage output, compares the phase of this voltage to the voltage received from a similar remote relay and closes a contact from the power line phase of a fault between relays;

an FM receiver circuit with an input band-pass filter and a noise filter tuned to use part of the frequency spectrum not used by the FM carrier signal, a limiting amplifier to make performance independent of the FM carrier signal level, a linear discriminator that converts frequency to a proportional dc voltage, a low pass filter to remove the FM carrier frequency from the demodulated signal, and an adjustable leading phase shift circuit;

an FM transmitter circuit with a linear voltage-to-frequency circuit with bias adjustments to set specified maximum and minimum frequencies for positive and negative peaks of the input modulating voltage, a low pass filter to remove all harmonics above the frequency spectrum in use, and an adjustable amplifier to transmit the FM signal to a telephone line;

a power hybrid circuit with a power amplifier, a matching resistor approximately equal to the internal impedance of the differential relay, identical voltage dividing networks connected to each end of the above resistor, and an inventory op-amp of adjustable gain for comparing the outputs of the two voltages divider networks;

a noise filter and amplifier circuit with an adjustable amplifier, a full wave rectifier and low pass filter, a reference voltage, a comparator circuit and means to remove the interface from operation for the condition of high noise on the telephone line and send a zero voltage signal to the remote end while shorting the output of the local FM receiver;

a carrier detector circuit with an adjustable amplifier, a full wave rectifier, a low pass filter, a reference voltage, a comparator circuit and means to remove the interface from operation for low FM carrier levels on the telephone lines and send a zero voltage signal to the remote end while shorting the output of the local FM receiver;

means for giving alarms for high noise and low FM carrier levels on the telephone lines.

* * * * *